March 15, 1938. A. BERSTED 2,111,417
ELECTRIC TOASTER
Filed April 30, 1937
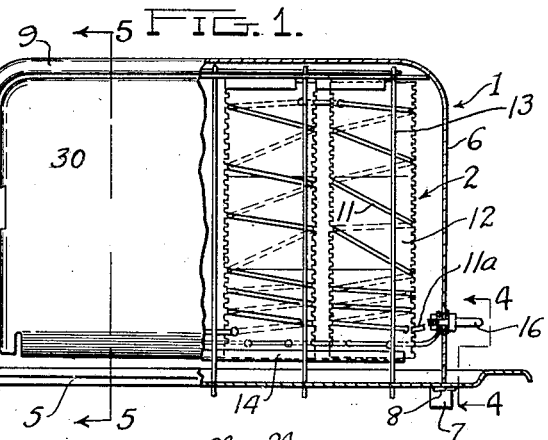
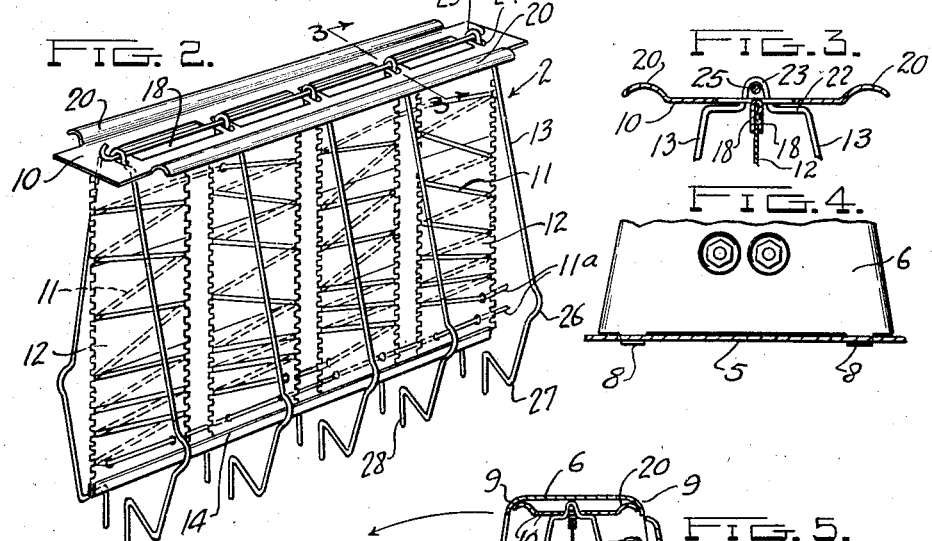
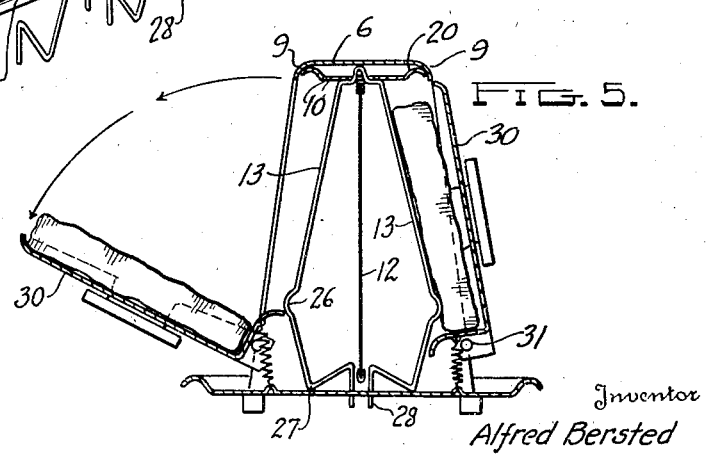
Inventor
Alfred Bersted
By Owen & Owen,
Attorneys.

Patented Mar. 15, 1938

2,111,417

UNITED STATES PATENT OFFICE 2,111,417

ELECTRIC TOASTER

Alfred Bersted, Fostoria, Ohio, assignor to Bersted Manufacturing Company, Fostoria, Ohio, a corporation of Ohio Application April 30, 1937, Serial No. 140,055

6 Claims. (Cl. 219—19)

This invention relates to electrical household appliances, and particularly to those adapted for the toasting of bread, or the like.

The primary object of the invention is the provision of certain improvements in electric toasters, whereby to simplify and cheapen the construction, facilitate the assembly of parts and produce a commercially efficient and practical device.

A more specific object of the invention resides in the construction and arrangement of parts and manner of assembling of the electric element carrying means and guards, whereby the whole may be easily and quickly mounted in or removed from the casing as a unit.

Another specific object of the invention resides in the form and arrangement of the casing parts and the ease and simplicity of assembly and connection thereof.

Other objects and advantages of the invention will be apparent from the following detailed description, and from the accompanying drawing illustrating one embodiment of the invention, in which—

Figure 1 is a side elevation of an electric toaster embodying the invention, with parts broken away; Fig. 2 is a perspective view of the heating and guard unit removed from the casing; Fig. 3 is an enlarged fragmentary section on the line 3—3 in Fig. 2; Fig. 4 is an enlarged fragmentary section on the line 4—4 in Fig. 1, and Fig. 5 is a section on the line 5—5 in Fig. 1, with one of the hinged side members in open position.

Referring to the drawing, 1 designates what may be termed the casing of the device and 2 the heating and guard unit, which latter is insertable in and removable as a unit from the casing.

The casing 1 includes a base member 5 and a top member 6. The member 5, in the present instance, is in the form of a tray, having a raised marginal edge flange, and has shallow feet 7 on its under side. The top member 6 is of inverted U-form with its leg terminals seating on the base member 5 within the cupped portion thereof and secured thereto by spurs 8 projecting from the leg ends through apertures in the base member and bent thereunder. The top member 6, for cheapness of construction, preferably comprises a single piece of sheet metal bent in U-form and having its leg portions gradually broadened from their inner ends outwardly. The side edges of the top member are preferably formed with quarter-round inturned flanges 9 to give a finished appearance to the member and to render the loop or cross portion thereof of crosswise dished-form at its under side to receive the top parts of the unit 2, as hereinafter described.

The heating and guard unit 2 comprises a top plate 10, electric resistance elements 11 wound around and supported by strips 12 of mica, or other suitable insulating material, and guard wires 13. The insulating strips 12, in the present instance, are four in number disposed in slightly spaced edge to edge relation and connected at their lower ends by a strip 14. This strip is preferably of sheet metal doubled upon itself to embrace and clamp the edges of the insulating strips. The wire constituting the elements 11 is successively looped around each mica strip 12 and has its end terminal portions 11ª connected to terminal posts 16 carried by one leg of the casing member 6, and to which a socket member of a current supply lead may be connected, as well understood in the art. The top plate 10 is provided lengthwise thereof with aligned pairs of opposing lips 18, which are struck downwardly from the plate and grip the upper end edges of the insulating strips 12 therebetween, so that such strips are suspended from the plate 10 by the clamping action of said lips. The pairs of lips 18 are of suitable number to engage all of the insulating strips 12. Each side edge of the plate 10 is formed with an upwardly and downwardly turned flange 20, which is adapted to seat within the respective rolled edge flange 9 of the casing member 6 when the plate 10 is disposed within the casing, as best shown in Fig. 5. The coaction of the flanges 20 with the casing flanges 9 holds the plate 10 centered within and spaced from the cross or loop portion of the top casing member 6.

The guards 13 are arranged in a plurality of opposing pairs with each pair formed from a single wire bent centrally upon itself to form a central top loop 22 which bears against the under side of the plate 10 and itself has a central loop portion 23 which extends up through a registering slot 24 in the plate 10, one of which, in the present instance, is disposed between each pair of lips 18 and one at the outer end of each end pair of lips, as best shown in Fig. 2. The guard wires are held in engagement with the plate 10 by a length of locking wire 25 which is extended through all of the loops 23 above the plate 10 and bent at its ends to prevent accidental removal. The leg portions of the guards 13 extend in slightly diverging relation downwardly from the respective loops 22, with their lower end portions converging below knee points 26 to points 27 where they are adapted to rest on the top of the base member 5 of the casing. From the points 27 each guard wire extends inwardly and upwardly and then downwardly to form a vertically disposed terminal end 28 which normally projects below the points 27 and loosely through a respective registering aperture in the base member 5. It is apparent that when the heating and guard unit 2 is mounted in the casing 1, the legs of the guard members 13, bearing at their angled points 27 against the base member 5, yieldingly hold the top plate 10 within the flanged cross part of the top member 6, while the terminal ends 28 of the members 13 yieldingly project through apertures in the base member to hold the guards in position.

The open sides of the casing 1 are closed without the heating and guard unit 2 by doors 30 which are hinged at their bottom edges to the lower portions of the legs of the top casing member 6, as shown at 31, to adapt the doors to have outward and downward opening movements. The doors are of cupped form to adapt them to hold one or more pieces of bread to be toasted, and when in closed position are inwardly inclined to adapt a piece of bread carried thereby to rest inwardly against the registering outwardly inclined portions of the guards 13, as well understood in the art.

It is apparent that I have provided an electric toaster, both the casing and the heating and guard unit of which are constructed in a manner to require a minimum of parts and to enable the parts to be easily and quickly assembled, and also to enable the heating and guard unit itself to be easily and quickly mounted in or removed from the casing unit.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. In an electric toaster, a heating and guard unit comprising a plate having a plurality of slots therein, a plurality of guard wires centrally bent upon themselves to form opposed guard members and having their top looped portions supporting said plate and looped through the slots therein, means for releasably engaging said looped portions to prevent their withdrawal from the plate slots, strips of insulating material attached to and suspended from said plate between the opposed guard members, and an electrical resistance element mounted on said strips and adapted to be connected to a source of electric current supply, and a casing in which said unit is detachably mounted and on the bottom of which the lower ends of said guard members are supported.

2. In an electric toaster, a casing having a top portion with a bottom recess and a bottom portion, and a heating and guard unit mounted in said casing, said unit including a flanged plate adapted to seat in the top recessed portion of the casing, a plurality of guard wires bent centrally upon themselves to provide a top looped portion for shouldered engagement with said plate and for interengagement with portions of the plate and having their lower ends forming thrust parts for seating on the bottom portion of the casing and also having inturned parts with downwardly extending ends, which latter pierce the bottom portion of the casing, mica strips clamped at their upper ends to and suspended from said plate, means rigidly connecting the lower ends of said strips and disposed between the inturned lower end portions of opposing guard members, and electric resistance elements carried by said mica strips and adapted to have connection with a source of electric current supply.

3. In an electric toaster, a casing having a top portion and a bottom portion, a heating and guard unit mounted in said casing, said unit including a plate adapted to seat upwardly against the top portion of the casing, a plurality of guard wires bent centrally upon themselves to provide a top looped portion for shouldered engagement with said plate and interengagement with portions of the plate and having their lower ends forming thrust parts for seating on the bottom portion of the casing and also having inturned parts spaced inwardly from said thrust parts with downwardly extending ends, which latter pierce the bottom portion of the casing, insulating strips suspended from said plate, and electric resistance elements carried by said strips and adapted to have connection with a source of electric current supply.

4. In an electric toaster, a casing having a top portion and a bottom portion, a heating and guard unit mounted in said casing, said unit including a plate adapted to seat upwardly against the top portion of the casing, a plurality of guard wires bent centrally upon themselves to provide a top looped portion for shouldered engagement with said plate and interengagement with portions of the plate and having their lower ends forming thrust parts for seating on the bottom portion of the casing and also having inturned parts spaced inwardly from said thrust parts with downwardly extending ends, which latter pierce the bottom portion of the casing, insulating strips suspended from said plate, releasable means coacting with said plate and said interengaging portions of said guard wires to retain them in assembled relation, and electric resistance elements carried by said strips and adapted to have connection with a source of electric current supply.

5. In an electric toaster, a casing having a top portion with its under side recessed and a bottom portion, a heating and guard unit mounted in said casing, said unit including a plate extending substantially the length of the top portion of said recess and having seating coaction with said top portion in centered relation thereto, a plurality of guard wires bent centrally upon themselves to provide a top looped portion for upward thrust engagement with the bottom of said plate intermediate its side edges and having their lower end portions in downward thrust engagement with the bottom portion of the casing and thence inwardly angled in releasable coaction with the casing at the inner sides of said thrust points, means releasably connecting the looped portions of the guard wires and said plate in assembled relation, and electric heating elements suspended from said plate in the space between the opposed downwardly extending portions of the guard wires.

6. In an electric toaster, a casing having a top portion and a bottom portion, a top plate at the under side of said top portion, and a guard wire bearing at its upper end portion against said top portion and having its lower end portion provided with an elbow in spring thrust coaction with said bottom portion and having a part extending inwardly from said elbow toward the center line of the bottom portion and thence downwardly in releasable piercing engagement with the bottom portion.

ALFRED BERSTED.